United States Patent
Zhao et al.

(10) Patent No.: US 11,375,480 B2
(45) Date of Patent: Jun. 28, 2022

(54) SIDELINK COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/345,562

(22) Filed: Jun. 11, 2021

(65) Prior Publication Data

US 2021/0306999 A1 Sep. 30, 2021

Related U.S. Application Data

(63) Continuation of application No. PCT/CN2018/121715, filed on Dec. 18, 2018.

(51) Int. Cl.
*H04W 4/00* (2018.01)
*H04W 72/04* (2009.01)
(Continued)

(52) U.S. Cl.
CPC ....... *H04W 72/0406* (2013.01); *H04L 5/0048* (2013.01); *H04W 4/40* (2018.02); *H04W 72/044* (2013.01)

(58) Field of Classification Search
CPC . H04W 72/0406; H04W 4/40; H04W 72/044; H04L 5/0048
(Continued)

(56) References Cited

U.S. PATENT DOCUMENTS

2018/0062809 A1* 3/2018 Baghel ................. H04L 1/0072
2020/0052843 A1* 2/2020 Cheng .................. H04L 5/0051
(Continued)

FOREIGN PATENT DOCUMENTS

| EP | 3591866 A1 * | 1/2020 | ........... H04L 5/0048 |
|---|---|---|---|
| WO | 2017026977 A1 | 2/2017 | |
| WO | 2018174537 A1 | 9/2018 | |

OTHER PUBLICATIONS

WO, International Search Report, PCT/CN2018/121715, dated Sep. 18, 2019, 30 pages.
(Continued)

*Primary Examiner* — Maharishi V Khirodhar
(74) *Attorney, Agent, or Firm* — Bayes PLLC

(57) ABSTRACT

The present disclosure describes a sidelink communication method and a terminal device. The method includes transmitting, by a second terminal device, sidelink control information (SCI) to a first terminal device. The SCI is used by the first terminal device to obtain information of a sidelink reference signal, and includes a first indication field used for indicating the first terminal device to determine resource indication information of the sidelink reference signal. In response to the resource indication information of the sidelink reference signal including frequency domain start position indication information of the sidelink reference signal but not frequency domain length information of the sidelink reference signal, the frequency domain length information of the sidelink reference signal is determined based on pre-configured information or information configured by a network device.

15 Claims, 3 Drawing Sheets

---

100

Receive, by a first terminal device, sidelink control information (SCI) sent from a second terminal device — S110

Obtain, by the first terminal device, information of a sidelink reference signal according to the SCI. — S120

(51) Int. Cl.
  *H04W 4/40* (2018.01)
  *H04L 5/00* (2006.01)
(58) Field of Classification Search
  USPC .......................................................... 370/329
  See application file for complete search history.

(56) References Cited

U.S. PATENT DOCUMENTS

| | | | | |
|---|---|---|---|---|
| 2020/0195317 A1* | 6/2020 | Yasukawa | ............. | H04W 16/28 |
| 2020/0322032 A1* | 10/2020 | Xiang | ............... | H04W 72/0406 |
| 2020/0337096 A1* | 10/2020 | Zhang | .................. | H04W 76/11 |
| 2021/0127376 A1* | 4/2021 | Zeng | ..................... | H04L 5/0048 |

OTHER PUBLICATIONS

PCT Written Opinion of the International Searching Authority issued in corresponding International Application No. PCT/CN2018/121715, dated Sep. 18, 2019, 6 pages.
"On SCI formats", Agenda Item: 7.2.4 1. 5, Source: Ericsson, 3GPP TSG-RAN WG 1 Meeting #94bis, R1 1813649, Chengdu, China, Oct. 8-12, 2018, 2 pages.
"Sidelink physical layer structure for NR V2X", Agenda Item: 7.2.4.1.1, Source: Huawei, HiSilicon, 3GPP TSG RAN WG1 Meeting #95, R1 1812206, Spokane, USA, Nov. 12-16, 2018, 12 pages.
"Discussion on physical layer structure for NR V2X", Agenda Item: 7.2.4.1.1, Source: LG Electronics, 3GPP TSG RAN WG1 Meeting #95, R1-1812841, Spokane, USA, Nov. 12-16, 2018, 7 pages.
"Considerations on Physical Layer aspects of NR V2X", Agenda item: 7.2.4.1.1, Source: Qualcomm Incorporated, 3GPP TSG RAN WG1 Meeting #95, R1-1813421, Spokane, USA, Nov. 12-16, 2018, 16 pages.
"Physical layer structure for SL NR V2X", Agenda Item: 7.2.4.1.1, Source: Ericsson, 3GPP TSG RAN WG1 Meeting #95, R1-1813638, Spokane, WA, US , Nov. 12-16, 2018, 13 pages.
"Efficient Sidelink CSI Feedback Mechanism for Groupcast NR-V2X", Agenda Item: 7.2.4.1.2, Source: Fujitsu, 3GPP TSG RAN WG1, Meeting #95, R1-1812408, Spokane, Washington, USA, Nov. 12-16, 2018, 6 pages.
"Support of unicast, groupcast and broadcast in NR V2X", Agenda item: 7.2.4.1.2, Source: ZTE, Sanechips, 3GPP TSG RAN WG1 Meeting #95, R1-1812730, Spokane, USA, Nov. 12-16, 2018, 6 pages.
"Discussion on Physical Layer Procedures", Agenda item: 7.2.4.1.2, Source: Samsung, 3GPP TSG RAN WG1 Meeting #95, R1-1812985, Spokane, USA, Nov. 12-16, 2018, 6 pages.
"Sidelink physical layer procedure", Agenda Item: 7.2.4.1.2, Source: NTT DOCOMO, INC., 3GPP TSG RAN WG1 Meeting #95, R1-1813318, Spokane, USA, Nov. 12-16, 2018, 5 pages.

"Sidelink CSI", Agenda Item: 7.2.4.1.5, Source: Huawei, HiSilicon, 3GPP TSG RAN WG1 Meeting #95, R1-1813553, Spokane, USA, Nov. 12-16, 2018, 6 pages.
"On CSIT acquisition for SL unicast", Agenda Item: 7.2.4.1.5, Source: Ericsson, 3GPP TSG RAN WG1 Meeting #95 R-1813643, Spokane, WA, US , Nov. 12-16, 2018, 5 pages.
Supplementary Partial European Search Report issued in corresponding European Application No. 18943607.4, dated Nov. 12, 2021, 14 pages.
Tan, Huan et al., "D2D Neighbor Discovery and Resource Scheduling Through Demodulation Reference Signal", 2016 IEEE 84th Vehicular Technology Conference (VTC-FALL), Sep. 18, 2016, 6 pages.
Peng, Fei et al., "A Prototype Performance Analysis for V2V Communications using USRP-based Software Defined Radio Platform", 2018 IEEE Global Conference on Signal and Information Processing (GLOBALSIP), IEEE, Nov. 26, 2018, 5 pages.
"Clarification on CRC value for initialization of PSSCH sidelink scrambling and DMRS sequence generation (Correction to V2V CR—36.212)", Agenda item: 7.1.8, Source: Intel Corporation, 3GPP TSG RAN WG1 Meeting #86bis, R1-1609455, Lisbon, Portugal, Oct. 10-14, 2016, 2 pages.
Extended European Search Report issued in corresponding European Application No. 18943607.4, dated Apr. 8, 2022, 29 pages.
"Discussion on physical layer structure and procedures for NR sidelink", Agenda Item: 7.2.4.1.2, Source: LG Electronics, 3GPP TSG RAN WG1 Meeting #94bis, R1-1810281, Chengdu, China, Oct. 8-12, 2018, 7 pages.
"Physical Layer Procedures for NR V2X Sidelink Communication", Agenda: 7.2.4.1.2, Source: Intel Corporation, 3GPP TSG RAN WG1 Meeting #95, R1-1812489, Spokane, USA, Nov. 12-16, 2018, 12 pages.
"Resource allocation mechanism", Agenda Item: 7.2.4.1.4, Source: AT&T, 3GPP TSG RAN WG1 Meeting #95, R1-1812872, Spokane, USA, Nov. 12-16, 2018, 11 pages.
"On PSSCH DMRS Signal Generation and Performance Analysis", Agenda: 7.1.3, Source: Intel Corporation, 3GPP TSG RAN1 WG Meeting #88, R1-1702138, Athens, Greece, Feb. 13-17, 2017, 5 pages.
"Discussion on physical layer structures for NR V2X", Agenda item: 7.2.4.1.1, Source: Samsung, 3GPP TSG RSN WG1 #95, R1-1813866, Spokane, USA, Nov. 12-16, 2018, 11 pages.
"Physical layer design of NR sidelink", Agenda Item: 7.2.4.1.2, Source: Ericsson, 3GPP TSG-RAN WG1 Meeting #94, R1-1809302, Goteborg, Sweden, Aug. 20-24, 2018, 10 pages.
"Further Analysis on Control Information for D2D Communication", Agenda Item: 7.2.8.1.2, Source: Fujitsu, 3GPP TSG RAN WG1 Meeting #76, R1-140196, Prague, Czech Republic, Feb. 10-14, 2014, 3 pages.
"Details of resource pool design for sidelink V2V communication", Agenda: 7.2.2 3, Source: Intel Corporation, 3GPP TSG RAN WG1 Meeting #86, R1-166515, Gothenburg, Sweden, Aug. 22-26, 2016, 8 pages.

* cited by examiner

SIDELINK COMMUNICATION METHOD AND TERMINAL DEVICE

CROSS-REFERENCE TO RELATED APPLICATION

The present disclosure is a continuation application of PCT Application No. PCT/CN2018/121715, filed on Dec. 18, 2018, which is hereby incorporated by reference in its entirety.

BACKGROUND

Embodiments of the present disclosure relate to the field of communications, and more particularly, to a sidelink communication method and a terminal device.

In order to improve throughput of a system, a terminal may measure a channel based on some reference signals, and select appropriate transmission parameters based on a measurement result. For example, channel measurement is performed based on channel state information-reference signals (CSI-RS), various quality information is selected and fed back to a transmitting end, thereby improving the throughput of the system.

In a vehicle to everything (V2X) system, various reference signals are also introduced, and how to transmit a sidelink reference signal on a sidelink is a problem to be solved.

SUMMARY

Embodiments of the present disclosure provide a sidelink communication method and a terminal device, which may realize sidelink reference signal transmission on a sidelink, thereby improve throughput of a vehicle to everything system.

In a first aspect, there is provided a sidelink communication method, including receiving, by a first terminal device, sidelink control information (SCI) transmitted from a second terminal device; and obtaining, by the first terminal device, information of a sidelink reference signal according to the SCI.

In a second aspect, there is provided a sidelink communication method, including transmitting, by a second terminal device, sidelink control information (SCI) to a first terminal device, where the SCI is used by the first terminal device to obtain information of a sidelink reference signal.

In a third aspect, there is provided a terminal device, configured to perform the method in the first aspect or any of the implementations thereof.

Specifically, the terminal device includes functional modules configured to perform the method in any one of the first to second aspects or any of the implementations thereof.

In a fourth aspect, there is provided a terminal device, including a processor and a memory. The memory is configured to store a computer program, and the processor is configured to call and run the computer program stored in the memory to execute the method in any one of the first to second aspects or any of the implementations thereof.

In a fifth aspect, there is a chip, configured to perform the method in any one of the first to second aspects or any of the implementations thereof.

Specifically, the chip includes a processor, configured to call and run a computer program from a memory, so that a device installed with the chip performs the method in any one of the first to second aspects or any of the implementations thereof.

In a sixth aspect, there is provided a computer-readable storage medium, configured to store a computer program that causes a computer to perform the method in any one of the first to second aspects or any of the implementations thereof.

In a seventh aspect, there is provided a computer program product, including computer program instructions, which cause the computer to perform the method in any one of the first to second aspects or any of the implementations thereof.

In an eighth aspect, there is provided a computer program which, when run on a computer, causes the computer to perform the method in any one of the first to second aspects or any of the implementations thereof.

DETAILED DESCRIPTION

Figure 1:
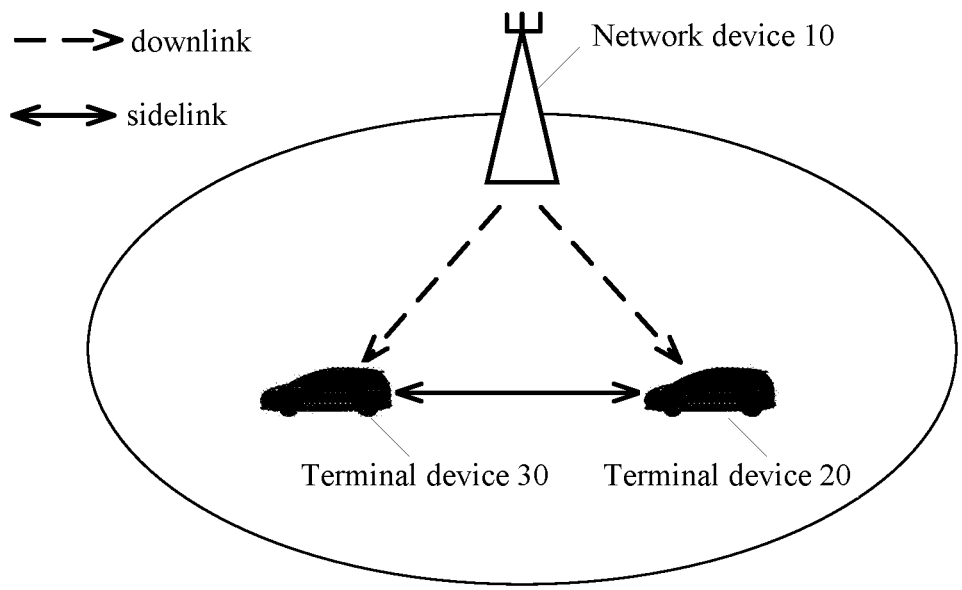
FIG. 1 is a schematic diagram of a sidelink communication system provided by an embodiment of the present disclosure.

The technical solutions in the embodiments of the present disclosure will be described below with reference to the accompanying drawings in the embodiments of the present disclosure. Apparently, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

It should be understood that the technical solutions according to the embodiments of the present disclosure may be applied to a variety of communications systems, such as a Global System for Mobile communications (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communications system, a new radio (NR) or a future 5G system, or the like.

In particular, the technical solutions of the embodiments of the present disclosure may be applied to various communication systems based on non-orthogonal multiple access technologies, such as a Sparse Code Multiple Access (SCMA) system, a Low Density Signature (LDS) system or the like. Of course, the SCMA system and LDS system may also be called differently in the communication field. Further, the technical solutions of the embodiments of the present disclosure may be applied to multi-carrier transmission systems using the non-orthogonal multiple access technology, such as Orthogonal Frequency Division Multiplexing (OFDM), Filter Bank Multi-Carrier (FBMC), Generalized Frequency Division Multiplexing (GFDM) and Filtered-OFDM (F-OFDM) systems using the non-orthogonal multiple access technology, etc.

The terminal device in the embodiments of the present disclosure may refer to user equipment (UE), an access terminal, a user unit, a user station, a mobile station, a mobile platform, a remote station, a remote terminal, a mobile device, a user terminal, a terminal, a wireless communication device, a user agent, or a user device. The access terminal may be a cellular phone, a cordless telephone, a session initiation protocol (SIP) telephone, a wireless local loop (WLL) station, a personal digital assistant (PDA), a handheld device having a wireless communication function, a computation device or other processing devices connected to a radio modem, a vehicle device, a wearable device, UE in a future 5G network, or a terminal device in the public land mobile network (PLMN) that will be evolved in the future, and the like.

The network device in the embodiments of the present disclosure may be a device used for communicating with the terminal device. The network device may be a base transceiver station (BTS) in GSM or CDMA or a nodeB (NB) in a WCDMA system, or an evolutional Node B (eNB or eNodeB) in a LTE system, or a radio controller in a cloud radio access network (CRAN). Or, the network device may be a relay station, an access point, a vehicle-mounted device, a wearable device, and a network device in a future 5G network, or a network device in a public land mobile network (PLMN) that will be evolved in the future, and the like.

Figure 2:
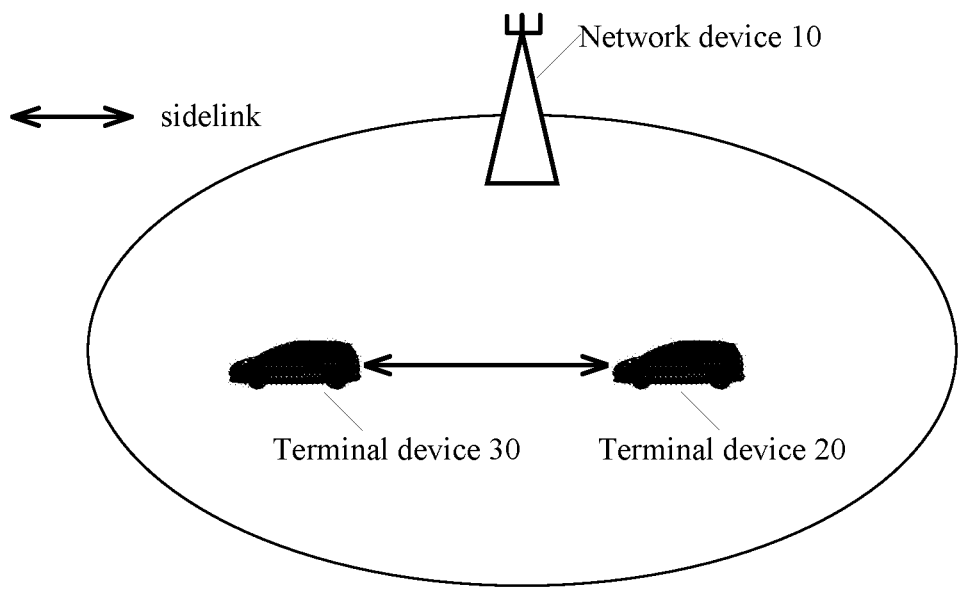
FIG. 2 is a schematic diagram of a sidelink communication system provided by an embodiment of the present disclosure.

FIGS. 1 and 2 are schematic diagrams of an application scenario of an embodiment of the present disclosure. FIG. 1 exemplarily illustrates one network device and two terminal devices. Optionally, the wireless communication system may include a plurality of network devices, and a coverage range of each network device may include other numbers of terminal devices, which is not limited by the embodiment of the present disclosure. In addition, the wireless communication system may further include other network entities such as a mobile management entity (MME), a serving gateway (S-GW), a packet data network gateway (P-GW), etc. However, the embodiments of the present disclosure are not limited to this.

Specifically, a terminal device 20 and a terminal device 30 may communicate with each other in a device to device (D2D) communication mode. When performing D2D communication, the terminal device 20 and the terminal device 30 directly communicate with each other through a D2D link, that is, a sidelink (SL). For example, as shown in FIG. 1 or FIG. 2, the terminal device 20 and the terminal device 30 directly communicate with each other through the sidelink. In FIG. 1, the terminal device 20 and the terminal device 30 communicate with each other through the sidelink, and the transmission resources of the terminal device 20, 30 are assigned by a network device. In FIG. 2, the terminal device 20 and the terminal device 30 communicate with each other through the sidelink, and the transmission resources of the terminal device 20, 30 are independently selected by the terminal devices rather than being assigned by the network device.

The D2D communication mode may be applied to Vehicle to Vehicle (V2V) communication or Vehicle to Everything (V2X) communication. In V2X communication, X may generally stand for any device with the capability of wireless receiving and transmitting, such as but not limited to a slowly-moving wireless apparatus, a fast-moving vehicle-mounted device, or a network control node with the capability of wireless transmitting and receiving. It should be understood that the embodiments of the present disclosure are mainly applied to a V2X communication scenario, but may also be applied to any other D2D communication scenario, which is not limited in the embodiments of the present disclosure.

In Release-14 of the 3GPP protocol, LTE-V2X is standardized, and two transmission modes are defined, namely Mode 3 and Mode 4. The transmission resources of the terminal device using Mode 3 are assigned by the base station, and the terminal device performs data transmission on the sidelink based on the resources assigned by the base station. The base station may allocate resources for a single transmission to the terminal device, or may allocate resources for semi-persistent static transmission to the terminal device. If the terminal device using mode 4 has a sensing capability, data is transmitted through a manner of sensing and reservation, and if the terminal device does not have the sensing capability, the transmission resource is randomly selected in a resource pool. The terminal device with the sensing capability obtains a set of available resources in the resource pool by sensing, and randomly selects a resource from the set of available resources for data transmission. Because services in the V2X system have periodic characteristics, the terminal device usually adopts a semi-persistent static transmission method, that is, once a transmission resource is selected by the terminal device, the resource will be continuously used by the terminal in multiple transmission cycles so that a probability of resource reselection and resource conflicts is reduced. The terminal device will carry, in the control information of the current transmission, information for reserving a resource for the next transmission, so that other terminal devices may determine whether such resource is reserved and used by the terminal device by detecting the control information of the terminal device. In this way, resource conflicts are reduced.

In the NR-V2X system, multiple transmission modes are introduced, such as mode 1 and mode 2. In mode 1, transmission resources are allocated to the terminal by the network (similar to mode 3 in LTE-V2X). In mode 2, transmission resources are chosen by the terminal, and mode 2 further includes but not limited to mode 2a, mode 2b, mode 2c and mode 2d.

In mode 2a, the terminal autonomously selects transmission resources (similar to mode 4 in LTE-V2X). For example, the terminal autonomously selects resources in a pre-configured resource pool or a resource pool configured by the network (the resources may be selected randomly, or through sensing).

In mode 2b, the terminal assists other terminals in selecting resources. For example, a first terminal transmits auxiliary information to a second terminal. The auxiliary information may include, but is not limited to: available time-frequency resource information, available transmission resource set information, channel measurement information, and channel quality information (such as channel state information (CSI), channel quality indicator (CQI), precoding matrix indicator (PMI), rank indication (RI), reference signal receiving power (RSRP), reference signal receiving quality (RSRQ), received signal strength indicator (RSSI), path loss information, etc.).

In mode 2c, the terminal selects a resource among transmission resources configured for it. For example, the network configures multiple transmission resources for each terminal, and when transmitting sidelink data, the terminal selects one transmission resource among the multiple transmission resources configured by the network for data transmission.

In mode 2d, the first terminal allocates transmission resources to the second terminal. For example, the first terminal is a group header of group communication, the second terminal is a group member of the group, and the first terminal directly allocates time-frequency resources used for the sidelink transmission to the second terminal.

In NR-V2X, automatic drive needs to be supported, so higher requirements are put forward for data interaction between vehicles, such as higher throughput, lower delay, higher reliability, larger coverage, and more flexible resource allocation, etc.

In order to improve throughput of a system, the terminal may measure a channel, and select appropriate transmission parameters based on a measurement result. For example, channel measurement is performed based on CSI-RS, information, such as CQI, PMI, RI, is selected and fed back to a transmitting end, and the transmitting end selects appropriate transmission parameters according to the feedback information. In this way, the throughput of the system is improved.

On a sidelink of NR-V2X, various reference signals are further introduced, and there is a need to solve a problem of how to transmit reference signals on a sidelink.

Figure 3:
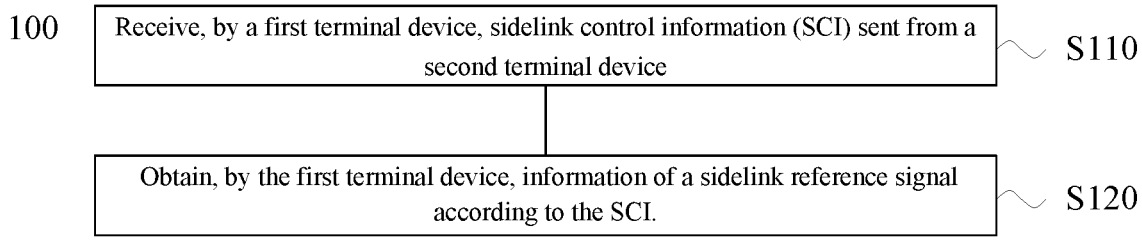
FIG. 3 is a schematic block diagram of a sidelink communication method provided by an embodiment of the present disclosure.

FIG. 3 is a schematic block diagram of a sidelink communication method 100 according to an embodiment of the present disclosure. The method may be executed by a terminal device served as a receiving end in FIG. 1 or FIG. 2. As shown in FIG. 3, the method 100 includes some or all of contents described below.

In S110, a first terminal device receives sidelink control information (SCI) transmitted from a second terminal device.

In S120, the first terminal device obtains information of a sidelink reference signal according to the SCI.

Specifically, the second terminal device may indicate various information of the sidelink reference signal to the first terminal device through the sidelink control information (SCI), so that the first terminal device may obtain the information of the sidelink reference signal. For example, the indication described here may be implemented in ways described below.

In a first method, the information of the sideline reference signal is carried in the SCI. For example, resource indication information of the sideline reference signal is carried in the SCI, and the first terminal device may obtain a time-frequency resource for the sidelink reference signal according to the resource indication information of the sidelink reference signal carried in the SCI.

In a second method, indication information indicating whether resource indication information of the sidelink reference signal is included in the SCI is carried in the SCI. For example, one bit is included in the SCI, this bit being 0 indicates that the resource indication information of the sidelink reference signal is not included in the SCI; this bit being 1 indicates that the resource indication information of the sidelink reference signal is included in the SCI, and in this case, the SCI includes an indication field for indicating a resource for the sidelink reference signal.

In a third method, the resource indication information of the sidelink reference signal is implicitly indicated through the SCI. For example, the resource indication information of the sidelink reference signal is indicated through a scrambling code sequence that scrambles the SCI. A correspondence between the scrambling code sequence and the resource indication information of the sidelink reference signal may be obtained through a network configuration manner or a protocol pre-configuration manner, and the correspondence may include correspondences between multiple scrambling code sequences and multiple transmission resources. For example, when the SCI is scrambled with a first scrambling code sequence, it indicates that the sidelink reference signal occupies a first transmission resource, and when the SCI is scrambled with a second scrambling code sequence, it indicates the sidelink reference signal occupies a second transmission resource.

In a fourth method, whether the resource indication information of the sidelink reference signal is included in the SCI is implicitly indicated through the SCI. For example, the scrambling code sequence that scrambles the SCI is used to indicate whether the resource indication information of the sidelink reference signal is included in the SCI. A correspondence between the scrambling code sequence and the indication information may be obtained through a network configuration manner or a protocol pre-configuration manner. For example, when the SCI is scrambled with a first scrambling code sequence, the indication information indicates that the SCI includes the resource indication information of the sidelink reference signal, and when the SCI is scrambled with a second scrambling code sequence, the indication information indicates that the SCI does not include the resource indication information of the sidelink reference signal.

In a fifth method, a format of the SCI is used to indicate whether the resource indication information of the sidelink reference signal is included in the SCI. For example, two SCI formats are predefined by the protocol. When a first SCI format is adopted, it indicates that the SCI includes the resource indication information of the sidelink reference signal; when a second SCI format is adopted, it indicates that the SCI does not include the resource indication information of the sidelink reference signal.

Optionally, the sidelink reference signal may be any one of the following signals: a sidelink CSI-RS, a sidelink sounding reference signal (SRS), a sidelink phase tracking reference signal (PT-RS), a demodulation reference signal (DMRS).

Optionally, the sidelink reference signal may also be replaced with a sidelink channel. That is to say, the first terminal device receives the SCI transmitted from the second terminal device, and the first terminal device may obtain information of the sidelink channel according to the SCI. For example, the sidelink channel may be a physical sidelink feedback channel (PSFCH).

Specifically, the second terminal device may indicate various information of the sidelink channel to the first terminal device through the SCI, so that the first terminal device may obtain the information of the sidelink channel. Similarly, the indication here may be implemented in the above-mentioned various methods, and for the sake of brevity, details are not repeated here.

Optionally, in the embodiments of the present disclosure, the resource indication information of the sidelink reference signal and/or the sidelink channel may be directly carried in the SCI. For example, the resource indication information of the sidelink CSI-RS may be carried in the SCI, and/or the resource indication information of the PSFCH may be carried in the SCI.

Specifically, the SCI may include a first indication field, and the first indication field may indicate a time-frequency resource for the sidelink reference signal, or may indicate a time-frequency resource for the sidelink channel. After receiving the SCI transmitted from the second terminal device, the first terminal device may first determine, according to the first indication field included in the SCI, that the SCI includes the resource indication information of the sidelink reference signal and/or the resource indication information of the sidelink channel. For example, the first terminal device determines that the first indication field indicates the time-frequency resource for the sidelink reference signal, and then the first terminal device may further determine the time-frequency resource for the sidelink reference signal according to a value of the first indication field.

Optionally, in the embodiments of the present disclosure, the SCI may further carry indication information indicating that whether the resource indication information of the sidelink reference signal and/or the resource indication information of the sidelink channel are included.

Specifically, the SCI may include a fourth indication field, and the fourth indication field is used for indicating whether the SCI includes the resource indication information of the sidelink reference signal and/or the resource indication information of the sidelink channel. After receiving the SCI transmitted from the second terminal device, the first terminal device may first determine, according to a value of the fourth indication field included in the SCI, that the SCI includes the resource indication information of the sidelink reference signal and/or the resource indication information of the sidelink channel. For example, the first terminal device determines that the value of the fourth indication field indicates that the SCI includes the resource indication information of the sidelink reference signal, and then the first terminal device may further obtain the resource indication information of the sidelink reference signal from the SCI, to determine the time-frequency resource indicated by the resource indication information of the sidelink reference signal.

Optionally, the first indication field and the fourth indication field may be the same indication field.

Optionally, in the embodiments of the present disclosure, resource indication information of a data channel may also be carried in the SCI, or the SCI may also carry indication information for indicating whether the SCI includes the resource indication information of the data channel.

For example, the SCI may include a second indication field, the second indication field may indicate resource indication information of the data channel, and the resource indication information of the data channel may also be data scheduling information for scheduling data. After receiving the SCI transmitted from the second terminal device, the first terminal device may determine, according to the second indication field included in the SCI, that the SCI includes the resource indication information of the data channel, and then the first terminal device may determine the time-frequency resource of the data channel according to the value of the second indication field.

As another example, the SCI may include a second indication field, and the second indication field may be used for indicating whether the SCI includes the resource indication information of the data channel. After receiving the SCI transmitted from the second terminal device, the first terminal device may first determine, according to a value of the second indication field included in the SCI, that the SCI includes the resource indication information of the data channel, and then the first terminal device may further obtain the resource indication information of the data channel from the SCI, and then may determine the time-frequency resource indicated by the resource indication information of the data channel. Alternatively, after receiving the SCI transmitted from the second terminal device, the first terminal device may first determine, according to the value of the second indication field included in the SCI, that the SCI does not include the resource indication information of the data channel, and at this time, the first terminal device may determine that the SCI only includes the resource indication information of the sidelink reference signal, and then the first terminal may determine the resource indication information of the sidelink reference signal according to the first indication field and/or the fourth indication field.

Optionally, the fourth indication field and the second indication field may also jointly indicate the information of the sidelink reference signal (and/or the sidelink channel) and the information of the data channel. In other words, the fourth indication field and the second indication field may be the same indication field. For example, the SCI may include two bits, and when the two bits have different values, they may represent different indication content: 00 may indicate that the SCI includes the resource indication information of the data channel, but does not include the resource indication information of the sidelink reference signal; 01 may indicate that the SCI includes the resource indication information of the sidelink reference signal, but does not include the resource indication information of the data channel; 10 may indicate that the SCI includes both the resource indication information of the sidelink reference signal and the resource indication of the data channel information.

Optionally, the SCI may further include a third indication field, and the third indication field is used for indicating whether the SCI only includes the resource indication information of the sidelink reference signal (and/or the sidelink channel). That is, the third indication field may also be used for indicating whether the SCI includes the resource indication information of the data channel. For example, the third indication field includes one bit, and a value one indicates that the SCI only includes the resource indication information of the sidelink reference signal (and/or the sidelink channel), but does not include the resource indication information of the data channel; a value zero indicates that the SCI includes both the resource indication information of the sidelink reference signal and the resource indication information of the data channel.

Optionally, the first indication field, the second indication field, the third indication field, and the fourth indication field may be carried in the SCI in any combination.

Optionally, the first indication field is used for indicating the resource indication information of the sidelink reference signal (and/or sidelink channel), and the second indication field is used for indicating whether the SCI includes the resource indication information of the data channel, the third indication field is used for indicating whether the SCI only includes the resource indication information of the sidelink reference signal (and/or the sidelink channel), and the fourth indication field is used for indicating whether the SCI includes the resource indication information of the sidelink reference signal (and/or the sidelink channel) may also be carried by the scrambling code sequence that scrambles the SCI. For example, the terminal device may obtain a correspondence between the value of the indication field and the scrambling code sequence through information pre-configured by protocols or network configuration information. Different indication field values correspond to different scrambling code sequences. For the second terminal device served as the transmitting end, it may select a corresponding scrambling code to scramble the SCI according to the value of the indication field. For the first terminal device served as the receiving end, it may descramble the received SCI according to different scrambling code sequences so as to determine the used scrambling code sequence, and then determine a value of the indication field corresponding to the scrambling code sequence used by the received SCI based on the correspondence.

The resource indication information of the sidelink reference signal (and/or the sidelink channel) is used for indicating the time domain resource and/or frequency domain resource for the sidelink reference signal (and/or the sidelink channel). The following takes the sidelink CSI-RS as an example to describe how the resource indication information is indicated.

The resource indication information of the sidelink CSI-RS may include time domain resource indication information of the sidelink CSI-RS, and specifically may include slot indication information of the sidelink CSI-RS and/or time domain symbol indication information of the sidelink CSI-RS.

For example, the resource indication information of the sidelink CSI-RS may only include the time domain symbol indication information, and in this case, after the first terminal device obtains the time domain symbol indication information of the sidelink CSI-RS according to the SCI, it may determine a time domain symbol occupied by the sidelink CSI-RS in one slot. For example, the time domain symbol indication information indicates that the sidelink CSI-RS occupies the last symbol in a slot. The slot indication information of the sidelink CSI-RS may be determined by the information pre-configured by protocols or information configured by the network device. For example, the network device may configure that, a slot where the sidelink CSI-RS is located may be determined by a slot where a physical sidelink control channel (PSCCH) carrying the SCI is located. Specifically, the slot where the sidelink CSI-RS is located may be a slot next to the slot where the PSCCH carrying the SCI is located, or it may also be the slot same as that where the PSCCH carrying the SCI is located.

As another example, the resource indication information of the sidelink CSI-RS may only include the slot indication information, and in this case, after the first terminal device obtains the slot indication information of the sidelink CSI-RS according to the SCI, it may determine the slot where the sidelink CSI-RS is located. The time domain symbol indication information of the sidelink CSI-RS may be determined by the information pre-configured by protocols or the information configured by the network device. For example, the network device may configure that the sidelink CSI-RS is in the last or penultimate symbol of the slot.

As another example, the resource indication information of the sidelink CSI-RS may include both the slot indication information and the time domain symbol indication information, and the first terminal device may determine the slot where the sidelink CSI-RS is located according to the time-slot indication information, the first terminal device may determine, according to the time domain symbol indication information, the symbol occupied by the sidelink CSI-RS in the slot indicated by the slot indication information.

Specifically, the slot indication information may be represented by a slot index. The slot index may be used to determine a slot. Alternatively, the slot indication information may also be represented by slot offset indication information. The slot offset indication information may be used for indicating slot offset of the slot where the sidelink CSI-RS is located relative to a time domain position. For example, the time domain position may be the slot where the PSCCH carrying the SCI is located, or it may be a position of slot 0 in a radio frame.

The resource indication information of the sidelink CSI-RS may include the frequency domain resource indication information of the sidelink CSI-RS, and specifically may include at least one of the following information: frequency domain start position indication information of the sidelink CSI-RS, frequency domain end position indication information of the sidelink CSI-RS, and frequency domain length information of the sidelink CSI-RS.

For example, the resource indication information of the sidelink CSI-RS may only include the frequency domain start position indication information or the frequency domain end position indication information. The frequency domain length information of the sidelink CSI-RS may be determined based on the information pre-configured by protocols or the information configured by the network device. For example, the network device may configure the sidelink CSI-RS to occupy two physical resource blocks (PRB) in the frequency domain. The first terminal device may further determine the frequency domain resource for the sidelink CSI-RS based on a frequency domain position indicated by the frequency domain start position indication information or the frequency domain end position indication information and a length occupied by the sidelink CSI-RS configured by the network device. As another example, it is pre-configured by protocols that the sidelink CSI-RS and the PSCCH carrying the SCI have the same frequency domain resource length, the first terminal device may further determine the frequency domain resource for the sidelink CSI-RS based on a frequency domain position indicated by the frequency domain start position indication information or the frequency domain end position indication information and length information of the frequency domain resource of the PSCCH carrying the SCI.

As another example, the resource indication information of the sidelink CSI-RS may only include the frequency domain length information. The frequency domain start position indication information or the frequency domain end position indication information of the sidelink CSI-RS may be determined based on information pre-configured by protocols or information configured by the network device. For example, the frequency domain start position of the sidelink CSI-RS may be configured as an offset of a frequency domain position, and the frequency domain position may be an agreed resource. Alternatively, the frequency domain start position of the sidelink CSI-RS may also be the same as the frequency domain start position of the PSCCH carrying the SCI.

As another example, the resource indication information of the sidelink CSI-RS may include the frequency domain start position indication information and the frequency domain end position indication information, or the resource indication information of the sidelink CSI-RS may include any of the frequency domain start position indication information and the frequency domain end position indication information and the frequency domain length information. After obtaining the resource indication information of the sidelink CSI-RS, the first terminal device may obtain the frequency domain resource indicated by the resource indication information of the sidelink CSI-RS.

Specifically, the frequency domain start position indication information or the frequency domain end position indication information may be a resource block of a frequency domain position directly indicated or an index value of a subband, or the like. Alternatively, it may be an offset relative to a frequency domain position, and the frequency domain position may be the lowest resource block/the highest resource block of the PSCCH carrying the SCI, or the frequency domain position corresponding to the subband, or a bandwidth start/end position of the carrier, or a start/end position of the bandwidth part, or the lowest resource block/the highest resource block of the synchronization signal or the frequency domain position corresponding to the index of the sub-band.

It should be noted that in the embodiments of the present disclosure, the slot may be replaced with a sub-frame, that is, the slot indication information may be replaced with sub-frame indication information.

Figure 4:
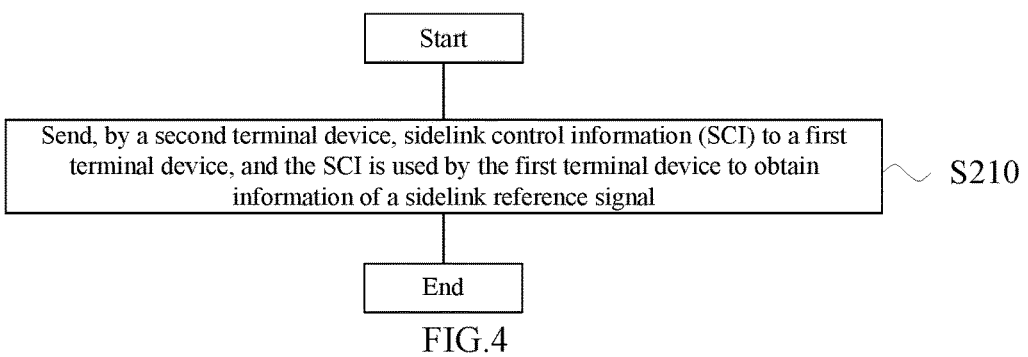
FIG. 4 is another schematic block diagram of a sidelink communication method provided by an embodiment of the present disclosure.

FIG. 4 is a schematic block diagram of a sidelink communication method 200 according to an embodiment of the present disclosure. The method may be executed by a certain terminal device served as the transmitting end in FIG. 1 or FIG. 2. As shown in FIG. 4, the method 200 includes some or all of contents described below.

In S210, a second terminal device transmits sidelink control information (SCI) to a first terminal device, and the SCI is used by the first terminal device to obtain information of a sidelink reference signal.

Optionally, in the embodiments of the present disclosure, the SCI includes a first indication field, and the first indication field is used by the first terminal device to determine resource indication information of the sidelink reference signal.

Optionally, in the embodiments of the present disclosure, the SCI includes a second indication field, and the second indication field is used for indicating whether the SCI includes resource indication information of a data channel.

Optionally, in the embodiments of the present disclosure, the resource indication information of the sidelink reference signal is used for indicating a time domain resource and/or frequency domain resource for the sidelink reference signal.

Optionally, in the embodiments of the present disclosure, the resource indication information of the sidelink reference signal includes at least one of the following information: slot indication information of the sidelink reference signal, time domain symbol indication information of the sidelink reference signal, frequency domain start position indication information of the sidelink reference signal, and frequency domain length information of the sidelink reference signal.

Optionally, in the embodiments of the present disclosure, if the resource indication information of the sidelink reference signal includes the slot indication information of the sidelink reference signal and does not include the time domain symbol indication information of the sidelink reference signal, a time domain symbol occupied by the sidelink reference signal in a slot is determined based on information pre-configured by protocols or information configured by a network device.

Optionally, in the embodiments of the present disclosure, if the resource indication information of the sidelink reference signal includes the time domain symbol indication information of the sidelink reference signal and does not include the slot indication information of the sidelink reference signal, the sidelink reference signal and a physical sidelink control channel (PSCCH) carrying the SCI are in the same slot.

Optionally, in the embodiments of the present disclosure, if the resource indication information of the sidelink reference signal includes the frequency domain start position indication information of the sidelink reference signal and does not include the frequency domain length information of the sidelink reference signal, frequency domain length information of the sidelink reference signal is determined based on information pre-configured by protocols or information configured by a network device.

Optionally, in the embodiments of the present disclosure, if the resource indication information of the sidelink reference signal includes the frequency domain length information of the sidelink reference signal and does not include the frequency domain start position indication information of the sidelink reference signal, the frequency domain start position of the sidelink reference signal is determined according to a frequency domain start position of the physical sidelink control channel (PSCCH) carrying the SCI.

Optionally, in the embodiments of the present disclosure, the sidelink reference signal includes sidelink channel state information reference signal (CSI-RS).

It should be understood that the interaction between the second terminal device and the first terminal device described in terms of the second terminal device and related characteristics and functions correspond to the related characteristics and functions of the first terminal device. That is to say, whatever message the second terminal device transmits to the first terminal device, the first terminal device receives a corresponding message from the second terminal device.

It should also be understood that in the embodiments of the present disclosure, the sequence number of the above-mentioned processes does not mean the performing order, and the performing order of the processes should be determined according to the functions and the internal logic thereof, and should not be limited in the implementations of the embodiments of the present disclosure.

The foregoing describes in detail the sidelink communication method according to the embodiments of the present disclosure, and a sidelink communication device according to the embodiments of the present disclosure will be described below with reference to FIGS. 5 to 7. The technical features described in the method embodiments are applicable to the following device embodiments.

Figure 5:
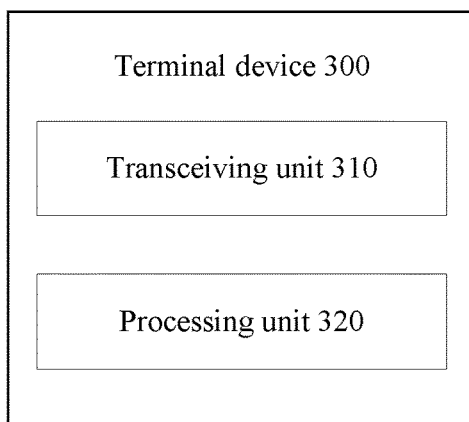
FIG. 5 is a schematic block diagram of a terminal device provided by an embodiment of the present disclosure.

FIG. 5 shows a schematic block diagram of a terminal device 300 according to an embodiment of the present disclosure. The terminal device 300 is a first terminal device. As shown in FIG. 5, the terminal device 300 includes a transceiving unit 310 and a processing unit 320.

The transceiving unit 310 is configured to receive sidelink control information (SCI) transmitted from a second terminal device.

The processing unit 320 is configured to obtain information of a sidelink reference signal according to the SCI.

Optionally, in the embodiments of the present disclosure, the SCI includes a first indication field, and the processing unit is specifically configured to determine that the SCI includes resource indication information of the sidelink reference signal, according to the first indication field.

Optionally, in the embodiments of the present disclosure, the SCI includes a second indication field, and the processing unit is further configured to determine whether the SCI includes resource indication information of a data channel, according to the second indication field.

Optionally, in the embodiments of the present disclosure, the resource indication information of the sidelink reference signal is used for indicating a time domain resource and/or frequency domain resource for the sidelink reference signal.

Optionally, in the embodiments of the present disclosure, the resource indication information of the sidelink reference signal includes at least one of the following information: slot indication information of the sidelink reference signal, time domain symbol indication information of the sidelink reference signal, frequency domain start position indication information of the sidelink reference signal, and frequency domain length information of the sidelink reference signal.

Optionally, in the embodiments of the present disclosure, if the resource indication information of the sidelink reference signal includes the slot indication information of the sidelink reference signal and does not include the time domain symbol indication information of the sidelink reference signal, the processing unit is further configured to determine, according to information pre-configured by protocols or information configured by a network device, a time domain symbol occupied by the sidelink reference signal in a slot.

Optionally, in the embodiments of the present disclosure, if the resource indication information of the sidelink reference signal includes the time domain symbol indication information of the sidelink reference signal and does not include the slot indication information of the sidelink reference signal, the processing unit is further configured to determine a slot where a physical sidelink control channel (PSCCH) carrying the SCI is located as a slot where the sidelink reference signal is located.

Optionally, in the embodiments of the present disclosure, if the resource indication information of the sidelink reference signal includes the frequency domain start position indication information of the sidelink reference signal and does not include the frequency domain length information of the sidelink reference signal, the processing unit is further configured to determine a frequency domain length of the sidelink reference signal according to the information pre-configured by protocols or the information configured by a network device.

Optionally, in the embodiments of the present disclosure, if the resource indication information of the sidelink reference signal includes the frequency domain length information of the sidelink reference signal and does not include the frequency domain start position indication information of the sidelink reference signal, the processing unit is further configured to determine a frequency domain start position of the sidelink reference signal according to a frequency domain start position of the physical sidelink control channel (PSCCH) carrying the SCI.

Optionally, in the embodiments of the present disclosure, the sidelink reference signal includes sidelink channel state information reference signal (CSI-RS).

It should be understood that the terminal device 300 according to the embodiments of the present disclosure may correspond to the first terminal device in the method embodiments of the present disclosure, and the above-mentioned and other operations and/or functions of the units in the terminal device 300 are used to implement the corresponding processes for the first terminal device in method as shown in FIG. 3, which will not be repeated here for the sake of brevity.

Figure 6:
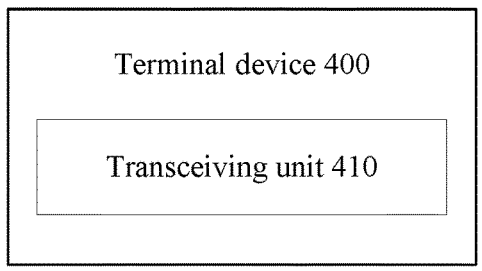
FIG. 6 is another schematic block diagram of a terminal device provided by an embodiment of the present disclosure.

FIG. 6 shows a schematic block diagram of a terminal device 400 according to an embodiment of the present disclosure. The terminal device 400 is a second terminal device. As shown in FIG. 6, the terminal device 400 includes a transceiving unit, configured to transmit sidelink control information (SCI) to a first terminal device, and the SCI is used by the first terminal device to obtain information of a sidelink reference signal.

Optionally, in the embodiments of the present disclosure, the SCI includes a first indication field, and the first indication field is used by the first terminal device to determine resource indication information of the sidelink reference signal.

Optionally, in the embodiments of the present disclosure, the SCI includes a second indication field, and the second indication field is used for indicating whether the SCI includes resource indication information of a data channel.

Optionally, in the embodiments of the present disclosure, the resource indication information of the sidelink reference signal is used for indicating a time domain resource and/or frequency domain resource for the sidelink reference signal.

Optionally, in the embodiments of the present disclosure, the resource indication information of the sidelink reference signal includes at least one of the following information: slot indication information of the sidelink reference signal, time domain symbol indication information of the sidelink reference signal, frequency domain start position indication information of the sidelink reference signal, and frequency domain length information of the sidelink reference signal.

Optionally, in the embodiments of the present disclosure, if the resource indication information of the sidelink reference signal includes the slot indication information of the sidelink reference signal and does not include the time domain symbol indication information of the sidelink reference signal, a time domain symbol occupied by the sidelink reference signal in a slot is determined based on information pre-configured by protocols or information configured by a network device.

Optionally, in the embodiments of the present disclosure, if the resource indication information of the sidelink reference signal includes the time domain symbol indication information of the sidelink reference signal and does not include the slot indication information of the sidelink reference signal, the sidelink reference signal and a physical sidelink control channel (PSCCH) carrying the SCI are in the same slot.

Optionally, in the embodiments of the present disclosure, if the resource indication information of the sidelink reference signal includes the frequency domain start position indication information of the sidelink reference signal and does not include the frequency domain length information of the sidelink reference signal, frequency domain length information of the sidelink reference signal is determined based on information pre-configured by protocols or information configured by a network device.

Optionally, in the embodiments of the present disclosure, if the resource indication information of the sidelink reference signal includes the frequency domain length information of the sidelink reference signal and does not include the frequency domain start position indication information of the sidelink reference signal, a frequency domain start position of the sidelink reference signal is determined according to a frequency domain start position of the physical sidelink control channel (PSCCH) carrying the SCI.

Optionally, in the embodiments of the present disclosure, the sidelink reference signal includes sidelink channel state information reference signal (CSI-RS).

It should be understood that the terminal device 400 according to the embodiments of the present disclosure may correspond to the second terminal device in the method embodiments of the present disclosure, and the above-mentioned and other operations and/or functions of the units in the terminal device 400 are intended to implement the corresponding processes for the second terminal device in the method shown in FIG. 4, which will not be repeated here for the sake of brevity.

Figure 7:
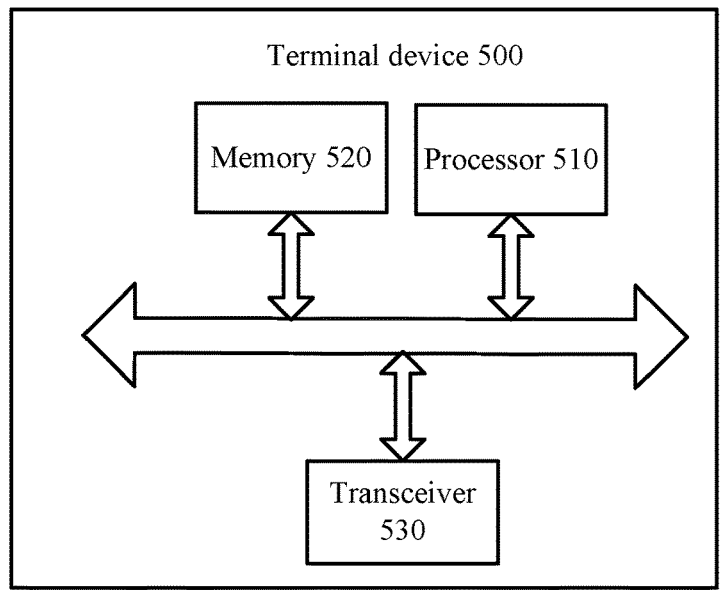
FIG. 7 is another schematic block diagram of a terminal device provided by an embodiment of the present disclosure.

As shown in FIG. 7, the embodiments of the present disclosure further provide a terminal device 500. The terminal device 500 may be the terminal device 300 shown in FIG. 5, which may be used to perform the operations of the first terminal device corresponding to the method 100 shown in FIG. 3. The terminal device 500 may be the terminal device 400 shown in FIG. 6, which may be used to perform the operations of the second terminal device corresponding to the method 200 shown in FIG. 4. The terminal device 500 shown in FIG. 7 includes a processor 510 which may call and run a computer program from a memory to implement the method in the embodiments of the present disclosure.

Optionally, as shown in FIG. 7, the terminal device 500 may further include a memory 520. The processor 510 may invoke the computer program from the memory 520 and run the computer program, to implement the method in the embodiments of the present disclosure.

The memory 520 may be a component independent of the processor 510, or may be integrated into the processor 510.

Optionally, as shown in FIG. 7, the terminal device 500 may further include a transceiver 530. The processor 510 may control the transceiver 530 to communicate with another device, and specifically, the transceiver 530 may transmit information or data to another device, or receive information or data transmitted by another device.

The transceiver 530 may include a transmitter and a receiver. The transceiver 530 may further include an antenna. There may be one or more antennas.

Optionally, the terminal device 500 may be the terminal device in the embodiments of the present disclosure, and the terminal device 500 may implement corresponding procedures implemented by the first terminal device in various methods in the embodiments of the present disclosure. For brevity, details are not described herein again.

In a specific implementation, the processing unit of the terminal device 300/terminal device 400 may be implemented by the processor 510 in FIG. 7. The transceiving unit in the terminal device 300/terminal device 400 may be implemented by the transceiver 530 in FIG. 7

Figure 8:
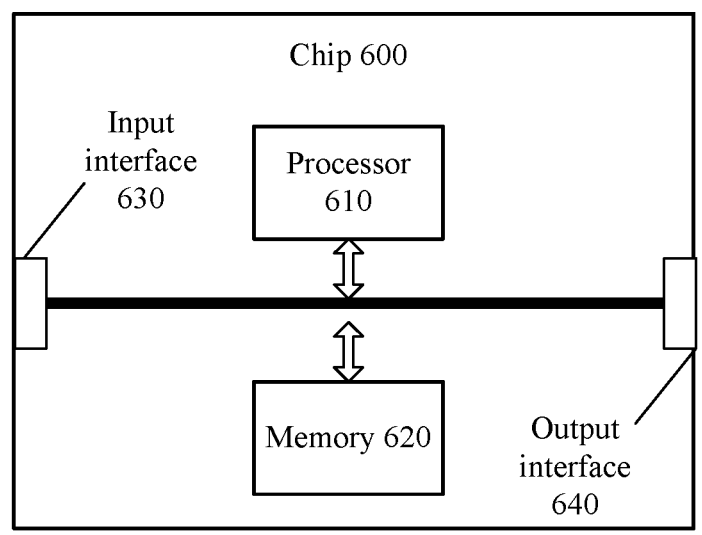
FIG. 8 is a schematic block diagram of a chip provided by an embodiment of the present disclosure.

FIG. 8 is a schematic structural diagram of a chip according to an embodiment of the present disclosure. The chip 600 shown in FIG. 8 includes a processor 610. The processor 610 may invoke a computer program from a memory and run the computer program, to implement the method in the embodiments of the present disclosure.

Optionally, as shown in FIG. 8, the chip 600 may further include a memory 620. The processor 610 may invoke the computer program from the memory 620 and run the computer program, to implement the method in the embodiments of the present disclosure.

The memory 620 may be a component independent of the processor 610, or may be integrated into the processor 610.

Optionally, the chip 600 may further include an input interface 630. The processor 610 may control the input interface 630 to communicate with another device or chip, and specifically, the input interface 630 may obtain information or data transmitted by another device or chip.

Optionally, the chip 600 may further include an output interface 640. The processor 610 may control the output interface 640 to communicate with another device or chip, and specifically, the output interface 640 may output information or data to another device or chip.

Optionally, the chip may be applied to the terminal device in the embodiments of the present disclosure, and the chip may implement corresponding procedures implemented by the terminal device in various methods in the embodiments of the present disclosure. For brevity, details are not described herein again.

It should be noted that, the chip mentioned in the embodiments of the present disclosure may also be referred to as a system-level chip, a system chip, a chip system, a system on chip, or the like.

Figure 9:
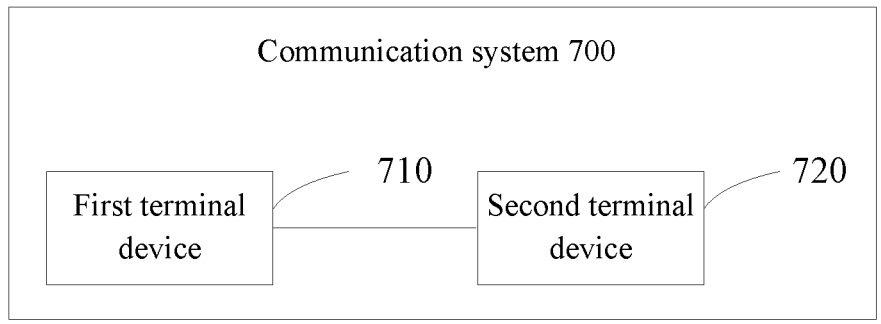
FIG. 9 is a schematic block diagram of a communication system provided by an embodiment of the present disclosure.

FIG. 9 is a schematic structural diagram of a communication system 700 according to an embodiment of the present disclosure. The communication system 700 shown in FIG. 9 includes a first terminal device 710 and a second terminal device 720.

The first terminal device 710 may implement corresponding functions implemented by the first terminal device in the foregoing method and the second terminal device 720 may implement corresponding functions implemented by the second terminal device in the foregoing method. For brevity, details are not described herein again.

It should be understood that the terms "system" and "network" herein may often be interchanged herein. The term "and/or" herein is only an association relationship that describes associated objects, and represents that there may be three relationships. For example, A and/or B may represent that: A exists alone, A and B exist simultaneously, and B exists alone. In addition, the character "/" herein generally indicates that front and back associated objects are in an "or" relationship.

It should be understood that, the processor of the embodiments of the present disclosure may be an integrated circuit chip, has a signal processing capability, the steps of the foregoing method embodiment may be implemented by using a hardware integrated logic circuit in the processor and/or implemented by using an instruction in a software form. The foregoing processor may be a general purpose processor, a digital signal processor (DSP), a field programmable gate array (FPGA), an application specific integrated circuit (ASIC) or another programmable logic device, a transistor logic device, or a discrete hardware component. The foregoing general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method embodiments in combination with hardware of the processor.

It should be understood that, the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synclink dynamic random access memory (SLDRAM), and a direct rambus random access memory (DRRAM). It should be noted that, the memory of the system and the method described in this embodiment of the present disclosure is intended to include but is not limited to these memories and any other suitable type of memory.

It should be understood that, the memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM), a direct rambus RAM (DR RAM), and the like. That is, the memory described in this embodiment of the present disclosure is intended to include but is not limited to these memories and any other suitable type of memory.

An embodiment of the present disclosure further provides a computer readable storage medium. The computer readable storage medium is configured to store a computer program.

Optionally, the computer readable storage medium may be applied to the network device in the embodiments of the present disclosure, and the computer program enables a computer to execute a corresponding procedure implemented by the network device in the methods of the embodiments of the present disclosure. For brevity, details are not described herein again.

Optionally, the computer readable storage medium may be applied to the terminal device in the embodiments of the present disclosure, and the computer program enables the computer to execute a corresponding procedure implemented by the mobile terminal/terminal device in the methods of the embodiments of the present disclosure. For brevity, details are not described herein again.

The present disclosure further provides a computer program product. The computer program product includes a computer program instruction.

Optionally, the computer program product may be applied to the network device in the embodiments of the present disclosure, and the computer program instruction enables the computer to execute a corresponding procedure implemented by the network device in the methods of the embodiments of the present disclosure. For brevity, details are not described herein again.

Optionally, the computer program product may be applied to the terminal device in the embodiments of the present disclosure, and the computer program instruction enables the computer to execute a corresponding procedure implemented by the terminal device in the methods of the embodiments of the present disclosure. For brevity, details are not described herein again.

The present disclosure further provides a computer program.

Optionally, the computer program may be applied to the network device in the embodiments of the present disclosure, and when run on a computer, the computer program instruction enables the computer to execute a corresponding procedure implemented by the network device in the methods of the embodiments of the present disclosure. For brevity, details are not described herein again.

Optionally, the computer program may be applied to the terminal device in the embodiments of the present disclosure, and when run on a computer, the computer program instruction enables the computer to execute a corresponding procedure implemented by the terminal device in the methods of the embodiments of the present disclosure. For brevity, details are not described herein again.

A person of ordinary skill in the art may be aware that, in combination with the examples described in the embodiments disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in the present disclosure, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that may store program code, such as a USB flash drive, a removable hard disk, a read-only memory (ROM), a random access memory (RAM), a magnetic disk, or an optical disc.

What is claimed is:

1. A method for sidelink communication, comprising:
   receiving, by a first terminal device, sidelink control information (SCI) transmitted from a second terminal device; and
   obtaining, by the first terminal device, information of a sidelink reference signal according to the SCI,
   wherein the SCI comprises a first indication field used for indicating the first terminal device to determine resource indication information of the sidelink reference signal,
   wherein the resource indication information of the sidelink reference signal is used for indicating at least one of a time domain resource or a frequency domain resource for the sidelink reference signal, and
   wherein, in response to the resource indication information of the sidelink reference signal comprising frequency domain start position indication information of the sidelink reference signal but not frequency domain length information of the sidelink reference signal, the frequency domain length information of the sidelink reference signal is determined based on pre-configured information or information configured by a network device.

2. The method according to claim 1, wherein, in response to the resource indication information of the sidelink reference signal comprising time domain symbol indication information of the sidelink reference signal but not slot indication information of the sidelink reference signal, the sidelink reference signal and a physical sidelink control channel (PSCCH) carrying the SCI are in a same slot.

3. The method according to claim 1, wherein the sidelink reference signal comprises sidelink channel state information reference signal (CSI-RS).

4. The method according to claim 1, wherein, in response to the SCI being in a first SCI format, the first indication field in the SCI is used for indicating the first terminal device to determine the resource indication information of the sidelink reference signal.

5. The method according to claim 1, wherein, in response to the SCI being in a second SCI format, the SCI does not comprise the resource indication information of the sidelink reference signal.

6. A method for sidelink communication, comprising:
   transmitting, by a second terminal device, sidelink control information (SCI) to a first terminal device, wherein the SCI is used by the first terminal device to obtain information of a sidelink reference signal,
   wherein the SCI comprises a first indication field, and the first indication field is used for indicating the first terminal device to determine resource indication information of the sidelink reference signal,
   wherein the resource indication information of the sidelink reference signal is used for indicating at least one of a time domain resource or a frequency domain resource for the sidelink reference signal, and
   wherein, in response to the resource indication information of the sidelink reference signal comprising frequency domain start position indication information of the sidelink reference signal but not frequency domain length information of the sidelink reference signal, the frequency domain length information of the sidelink reference signal is determined based on pre-configured information or information configured by a network device.

7. The method according to claim 6, wherein, in response to the resource indication information of the sidelink reference signal comprising time domain symbol indication information of the sidelink reference signal but not slot indication information of the sidelink reference signal, the sidelink reference signal and a physical sidelink control channel (PSCCH) carrying the SCI are in a same slot.

8. The method according to claim 6, wherein the sidelink reference signal comprises sidelink channel state information reference signal (CSI-RS).

9. The method according to claim 6, wherein, in response to the SCI being in a first SCI format, the first indication field in the SCI is used for indicating the first terminal device to determine the resource indication information of the sidelink reference signal.

10. The method according to claim 6, wherein, in response to the SCI being in a second SCI format, the SCI does not comprise the resource indication information of the sidelink reference signal.

11. A terminal device, wherein the terminal device is a second terminal device and comprises a processor and a memory for storing a computer program,
    wherein the processor is configured to call and run the computer program stored in the memory to control the terminal device to:
    transmit sidelink control information (SCI) to a first terminal device, wherein the SCI is used by the first terminal device to obtain information of a sidelink reference signal,
    wherein the SCI comprises a first indication field, and the first indication field is used for indicating the first terminal device to determine resource indication information of the sidelink reference signal,
    wherein the resource indication information of the sidelink reference signal is used for indicating at least one of a time domain resource or a frequency domain resource for the sidelink reference signal, and
    wherein, in response to the resource indication information of the sidelink reference signal comprising frequency domain start position indication information of the sidelink reference signal but not frequency domain length information of the sidelink reference signal, the frequency domain length information of the sidelink reference signal is determined based on pre-configured information or information configured by a network device.

12. The terminal device according to claim 11, wherein, in response to the resource indication information of the sidelink reference signal comprising time domain symbol indication information of the sidelink reference signal but not slot indication information of the sidelink reference signal, the sidelink reference signal and a physical sidelink control channel (PSCCH) carrying the SCI are in a same slot.

13. The terminal device according to claim 11, wherein the sidelink reference signal comprises sidelink channel state information reference signal (CSI-RS).

14. The terminal device according to claim 11, wherein, in response to the SCI being in a first SCI format, the first indication field in the SCI is used for indicating the first terminal device to determine the resource indication information of the sidelink reference signal.

15. The terminal device according to claim 11, wherein, in response to the SCI being in a second SCI format, the SCI does not comprise the resource indication information of the sidelink reference signal.

* * * * *